United States Patent
Hwang et al.

(10) Patent No.: US 11,886,439 B1
(45) Date of Patent: Jan. 30, 2024

(54) ASYNCHRONOUS CHANGE DATA CAPTURE FOR DIRECT EXTERNAL TRANSMISSION

(71) Applicant: Amazon Technologies, Inc., Seattle, WA (US)

(72) Inventors: Sangyong Hwang, Sammamish, WA (US); Aakash Ashwin Shah, Santa Clara, CA (US); Yongsik Yoon, Sammamish, WA (US); Kamal Kant Gupta, Belmont, CA (US); Saileshwar Krishnamurthy, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 16/552,776

(22) Filed: Aug. 27, 2019

(51) Int. Cl.
  *G06F 16/2455* (2019.01)
  *G06F 16/23* (2019.01)
  *G06F 16/27* (2019.01)

(52) U.S. Cl.
  CPC .... *G06F 16/24568* (2019.01); *G06F 16/2358* (2019.01); *G06F 16/2379* (2019.01); *G06F 16/24552* (2019.01); *G06F 16/273* (2019.01)

(58) Field of Classification Search
  CPC ......... G06F 16/24568; G06F 16/24552; G06F 16/2358; G06F 16/273; G06F 16/2379
  See application file for complete search history.

(56) References Cited

U.S. PATENT DOCUMENTS

| | | | |
|---|---|---|---|
| 6,032,158 A | 2/2000 | Mukhopadhyay et al. | |
| 6,622,152 B1* | 9/2003 | Sinn | G06F 11/2074 |
| | | | 714/E11.107 |
| 6,889,231 B1* | 5/2005 | Souder | G06F 16/27 |
| 7,076,508 B2 | 7/2006 | Bourbonnais et al. | |
| 7,426,559 B2 | 9/2008 | Hamel et al. | |
| 8,200,614 B2 | 6/2012 | Syed et al. | |
| 8,374,966 B1* | 2/2013 | Arora | G06F 16/27 |
| | | | 705/52 |
| 8,510,270 B2 | 8/2013 | Pareek et al. | |
| 8,943,282 B1 | 1/2015 | Armangau | |
| 10,078,556 B2 | 9/2018 | Clare et al. | |
| 10,582,001 B2 | 3/2020 | Straub | |
| 2003/0225798 A1* | 12/2003 | Norcott | G06F 16/283 |
| 2004/0010499 A1* | 1/2004 | Ghosh | G06F 16/2358 |
| 2004/0199552 A1* | 10/2004 | Ward | G06F 16/27 |

(Continued)

OTHER PUBLICATIONS

U.S. Appl. No. 17/213, 126, dated Mar. 25, 2021, Jaemyung Kim.

*Primary Examiner* — Robert W Beausoliel, Jr.
*Assistant Examiner* — Mohammad S Bhuyan
(74) *Attorney, Agent, or Firm* — S. Scott Foster; Kowert, Hood, Munyon, Rankin & Goetzel, P.C.

(57) ABSTRACT

Change data capture is performed asynchronously for direct transfer to a stream processor. When updates to a database as part of database transactions are performed, a transaction log is generated that describes the database transactions. The transaction log may be evaluated to determine indications of changes included in the database transactions. The indications of the changes may be stored in memory according to the database transactions that include the indications of the changes. When a database transaction is determined to be committed to the database, the change indications may be sent directly from the memory to the stream processor.

20 Claims, 10 Drawing Sheets

(56) References Cited

U.S. PATENT DOCUMENTS

| | | | |
|---|---|---|---|
| 2005/0009714 A1 | 1/2005 | Chen et al. | |
| 2005/0097149 A1* | 5/2005 | Vaitzblit | G06F 21/6227 |
| 2005/0125430 A1* | 6/2005 | Souder | G06F 16/27 |
| 2005/0262305 A1 | 11/2005 | Chow | |
| 2009/0037422 A1* | 2/2009 | Wong | G06F 16/27 |
| 2009/0300073 A1* | 12/2009 | Bourbonnais | G06F 16/273 |
| 2014/0330784 A1 | 11/2014 | Sundaram | |
| 2015/0310057 A1 | 10/2015 | Fu | |
| 2016/0004718 A1 | 1/2016 | Lin | |
| 2016/0110439 A1* | 4/2016 | Hrle | G06F 16/273 707/600 |
| 2016/0171070 A1* | 6/2016 | Hrle | G06F 16/2282 707/615 |
| 2017/0017692 A1 | 1/2017 | Das | |
| 2017/0322993 A1* | 11/2017 | Brodt | G06F 16/2358 |
| 2017/0347222 A1* | 11/2017 | Kanter | H04W 4/70 |
| 2017/0371968 A1 | 12/2017 | Horowitz | |
| 2019/0079834 A1 | 3/2019 | De Schrijver | |
| 2019/0079965 A1* | 3/2019 | Pareek | G06F 16/1865 |
| 2019/0238653 A1* | 8/2019 | Syomichev | G06F 3/0656 |
| 2020/0057722 A1 | 2/2020 | Wang | |
| 2020/0320059 A1* | 10/2020 | Kumar | G06F 16/2379 |
| 2020/0356474 A1 | 11/2020 | Doddameti | |

\* cited by examiner

ASYNCHRONOUS CHANGE DATA CAPTURE FOR DIRECT EXTERNAL TRANSMISSION

BACKGROUND

Database replication techniques offer users the opportunity to replicate changes made to one database across different locations, systems, services or devices, providing, among other features wide availability and accessibility of data stored in a database. Database replication techniques, however, are not implemented without costs. In order to ensure consistency with replicas of the database features, such as replication logging may be implemented in addition to the features that support the source database workload to perform, among many other operations, transactions or other updates to the source database. Therefore, techniques that can reduce the cost of database replication techniques while providing similar consistency assurances are highly desirable.

Figure 1:
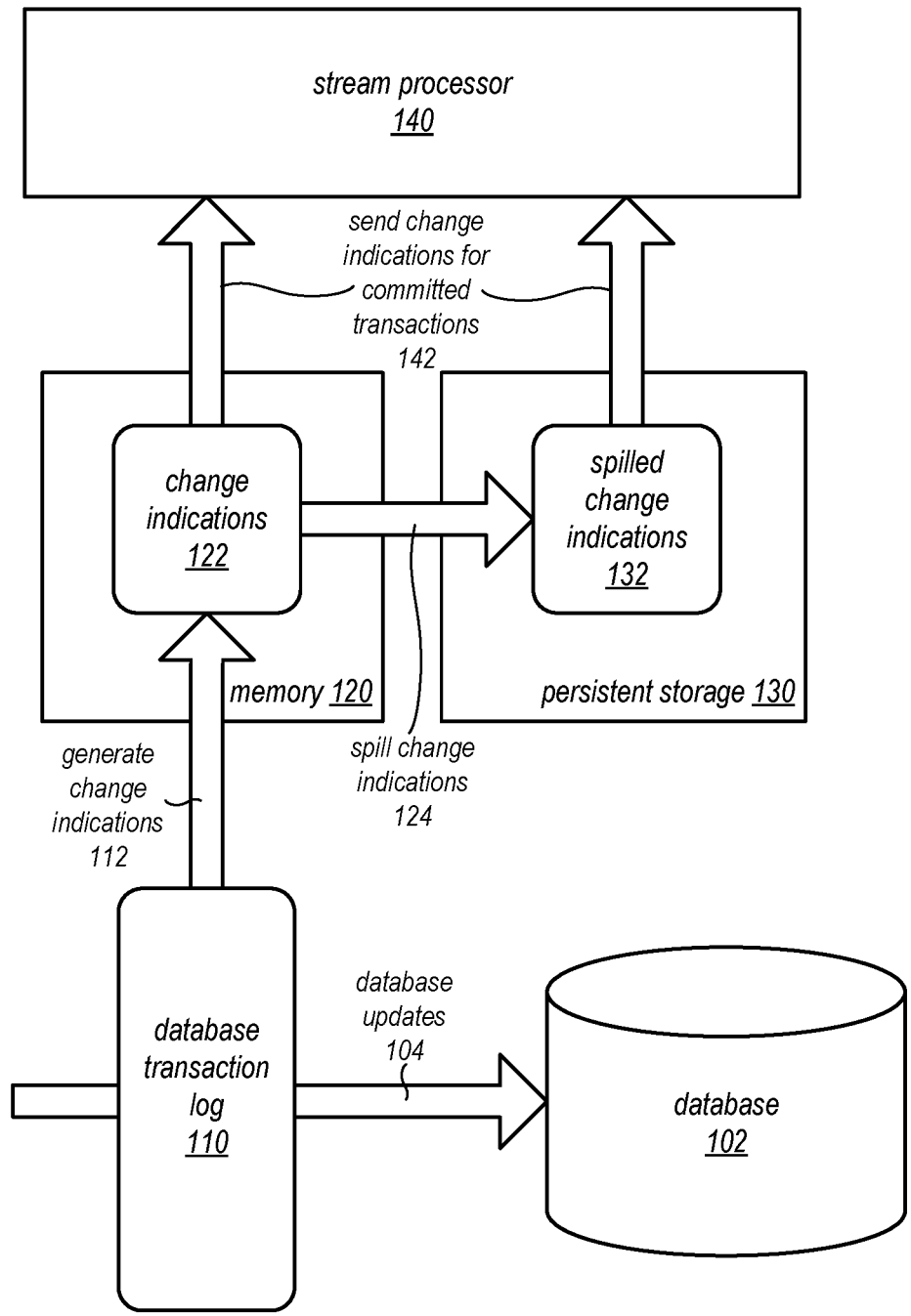
FIG. 1 is a logical block diagram illustrating asynchronous change data capture for direct external transmission, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for asynchronous change data capture for direct external transmission are described. Change Data Capture (CDC) techniques may be implemented in order to track, copy or react to the changes made to a database. For example, when change data capture for a database is enabled, the updates to a database can be replicated to a copy of database data which may be implemented in a different storage or database platform that supports different analyses on the database data. Alternatively, the performance of various analyses, applications, data transfer, or other operations may be triggered according to a database change captured when change data capture is enabled.

To avoid the costs associated with change data capture, asynchronous change data capture for direct external transmission may be implemented. For instance, updates to a database may proceed independently of the performance of operations to capture the changes of the updates (e.g., a write to a database can be received, performed, and acknowledged as committed to a client application of the database without waiting on operations to capture the change to be performed as well, such as synchronous change data capture techniques). Storage of the change data capture information may be initially performed in memory to avoid the costs of reading to and writing from persistent storage, in some embodiments. Some change indications, however, can be selectively stored in persistent storage to handle recovery scenarios or large transactions that could otherwise consume all change indication storage. In this way, changes may be streamed from a database to an external stream processor with minimal delay for sending the change indications and minimal disruption to other database operations (e.g., latency added to performing writes or other updates or queries to read data from the database), thus improving the performance of the database overall while still retaining the ability to implement change data capture.

FIG. 1 is a logical block diagram illustrating asynchronous change data capture for direct external transmission, according to some embodiments. A database transaction log 110 may be generated as updates 104 to database 102 are received. For example, redo log records (as discussed below with regard to FIGS. 3-5) may be used, in some embodiments, to describe the changes to a record or item of a database (or a portion of the database that includes the item, such as a data page). As indicated at 112, various indications of the changes to the database as a result of the updates in the transactions may be generated. For example, different techniques for augmenting, extracting, comparing, analyzing, or otherwise determining the changes performed to the database as a result of the update, and collecting or including the information used to replicate those changes (e.g., at a different data store, such as at same or different database management system) may be implemented.

Figure 10:
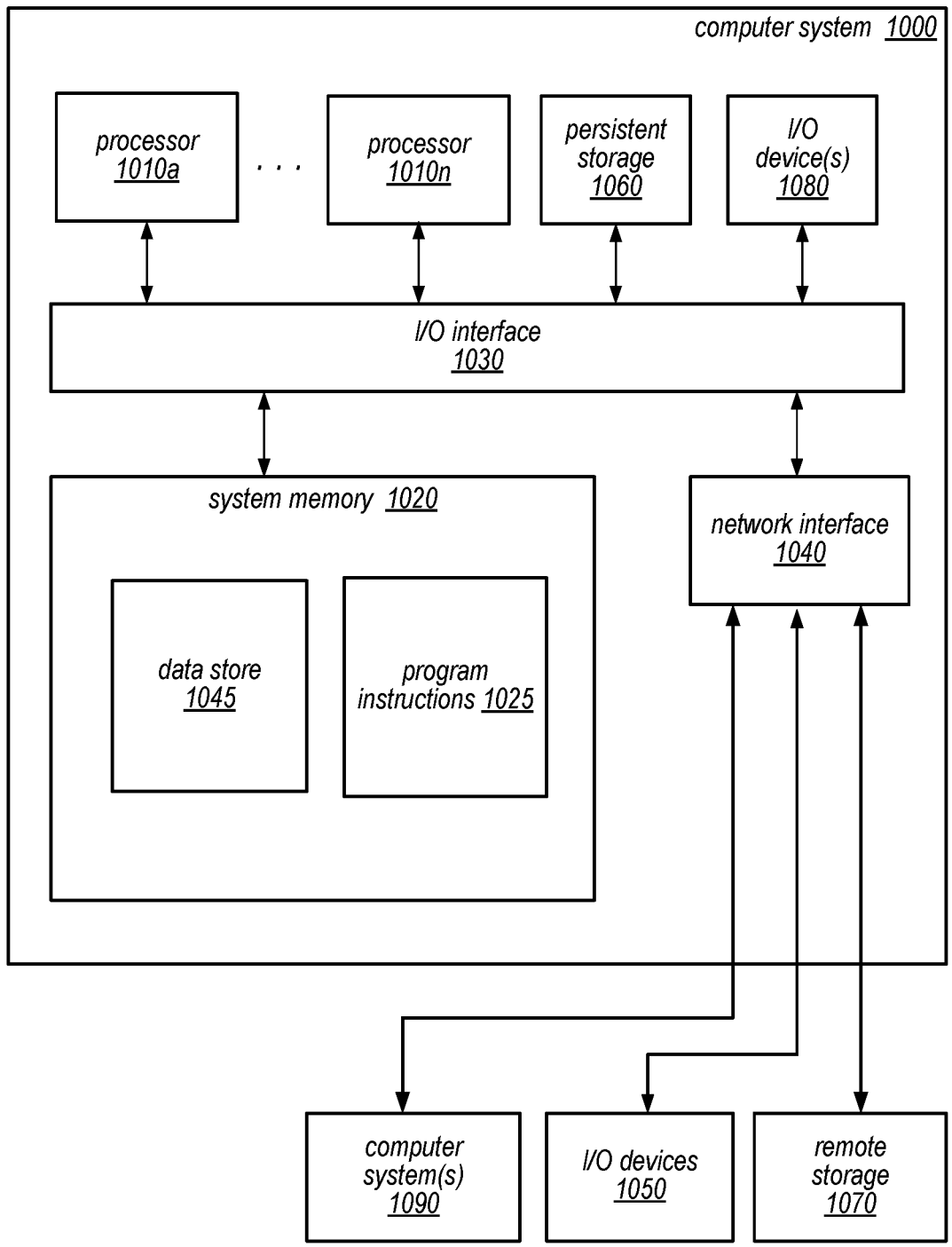
FIG. 10 is a block diagram illustrating a computer system that may implement at least a portion of systems described herein, according to some embodiments.

In various embodiments, change indications may be first stored in memory 120 (e.g., volatile or non-volatile memory, such as memory 1020 in FIG. 10) as part of change indications 122. In at least some embodiments, the change indications may be grouped according to transaction, as discussed below with regard to FIGS. 5, 7 and 8. For example, data structures such as hash tables and/or queues may be created to separate change indications into the corresponding transaction that caused the change and then update the respective portion of the data structure to record that change indication as part of the transaction. Change indications 122 may be maintained in memory 120 (e.g., without ever storing the change indications to a second storage device, such as a persistent storage device) until sent 142 to stream processor 140 after the transaction is committed, after a transaction is determined to fail (in which case the change indication(s) for that transaction may be deleted), or if spill criteria for change indications 122 in memory 120 is satisfied and the transaction is selected to be spilled 124 to persistent storage 130 (e.g., a block-based storage device, such as a disk drive, solid-state drive, and so on).

Even if a transaction is spilled 124 to persistent storage 130 as part of spilled change indications, the spilled transaction may be sent 142 to stream processor when committed. Moreover, other transactions may not be spilled (e.g., while the identified transaction is spilled) allowing for some change indications to stay in memory until committed, while those change indications for spilled transactions may be instead written to persistent storage. In at least some embodiments, change indications for a transaction may be sent 142 as a group of change indications for a transaction. In some embodiments, change indications may be sent 142 according to the order in which transactions were committed to the database.

Stream processor 140 may be external to a database, in various embodiments. For instance, stream processor 140 may be implemented on separate computing resources (e.g., servers, hosts, etc.). Stream processor 140 may be implemented as part of a separate service or network, in some embodiments, and may implement one (or more) of various types of stream processing platforms (e.g., Apache Kafka). Stream processor 140 may accept change indications as data stream records for storage, processing and providing to a consuming application (e.g., as operations to apply to a copy of some or all of a database). Change indications for committed transactions 142 may be sent directly to stream processor 140 (e.g., over a network connection between a database system and the stream processor), avoiding the necessity of intermediary change capture systems or tools. Moreover, the generation, storage, and sending of changes to a database to stream processor 140 may be performed asynchronously with respect to the updates 104 to database 102 that caused the changes.

Please note, FIG. 1 is provided as a logical illustration and is not intended to be limiting as to the physical arrangement, size, or number of components, modules, or devices to implement such features.

The specification first describes an example of a provider network that may implement a database service, storage service, and stream processing service, according to various embodiments. Included in the description of the example network-based services are techniques for performing asynchronous change data capture for direct external transmission. The specification then describes a flowchart of various embodiments of methods for asynchronous change data capture for direct external transmission. Next, the specification describes an example system that may implement the disclosed techniques. Various examples are provided throughout the specification.

Figure 2:
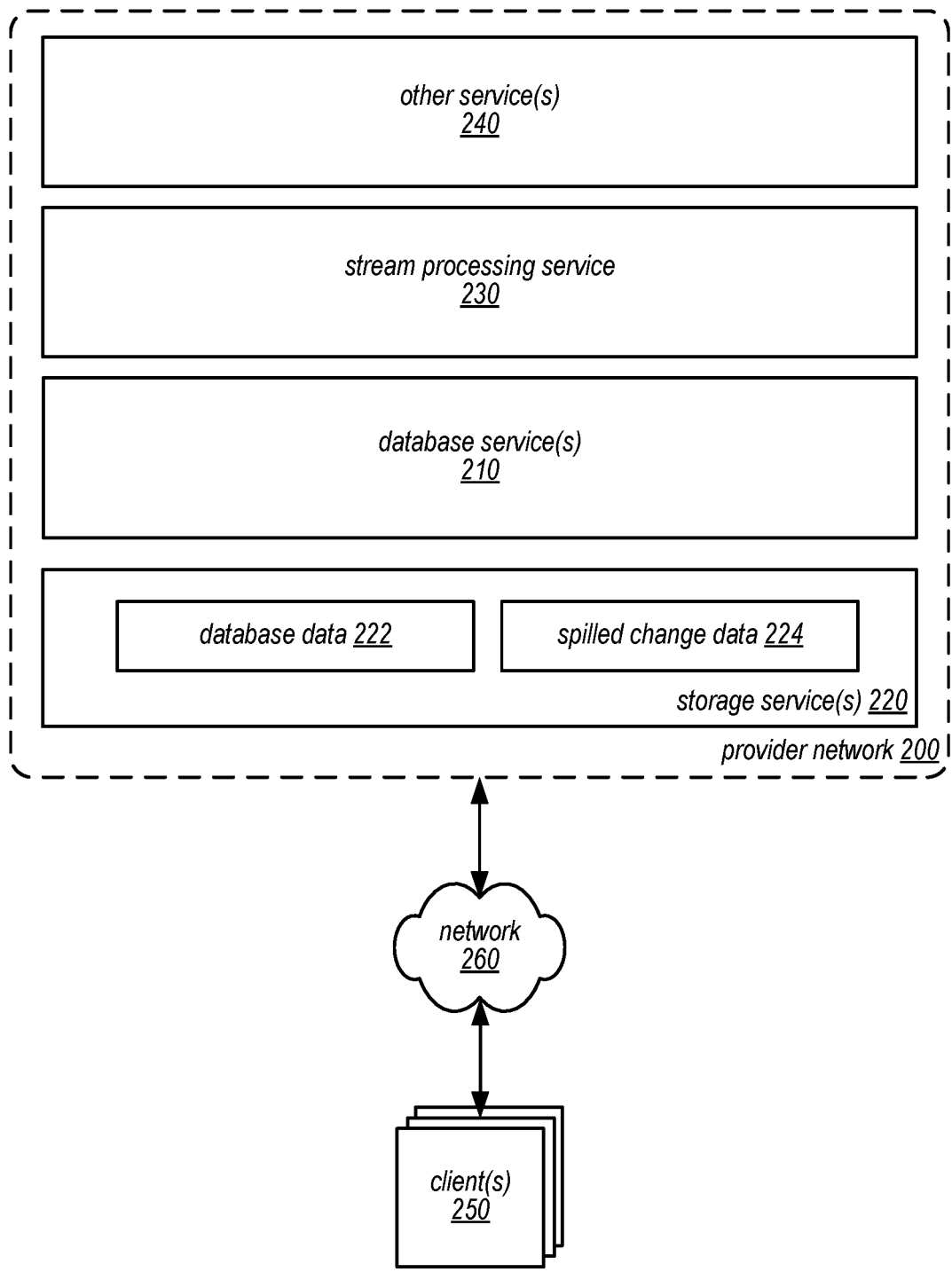
FIG. 2 is a logical block diagram illustrating a provider network that implements a database service, stream processing service and separate storage service that implements asynchronous change data capture for direct external transmission, according to some embodiments.

FIG. 2 is a logical block diagram illustrating a provider network that implements a database service, stream processing service and separate storage service that implements asynchronous change data capture for direct external transmission, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200.

In some embodiments, provider network 200 may implement various network-based services, including database service(s) 210, a storage service(s) 220, stream processing service(s) 230, and/or one or more other virtual computing services 240 (which may include various other types of storage, processing, analysis, communication, event handling, visualization, and security services). Database service(s) 210 may implement various types of database systems and formats (e.g., relational, non-relational, graph, document, time series, etc.) and the respective types of query engines to perform queries to those databases. Storage service(s) 220 may include many different types of data stores, including a log-structured storage service or other storage services as discussed below with regard to FIGS. 3 and 4, in some embodiments and may store both database data 222 and spilled change data 224.

Clients 250 may access these various services offered by provider network 200 via network 260. Likewise network-based services may themselves communicate and/or make use of one another to provide different services. For example, storage service 220 may store data 222 for databases managed by database service 210, in some embodiments. It is noted that where one or more instances of a given component may exist, reference to that component herein may be made in either the singular or the plural. However, usage of either form is not intended to preclude the other In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction or query with respect to a database, a request to manage a database, such as a request to enable or disable performing queries across different types of query engines, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application, a web server, a media application, an office application or any other application that may make use of provider network 200 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service client) may provide access to a database hosted in database service 210 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 200 may be coordinated by client 250 and the operating system or file system on behalf of applications executing within the operating system environment.

Client(s) 250 may convey network-based services requests (e.g., a request to perform a transaction to a database) to and receive responses from services implemented as part of provider network 200 via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 230 for processing.

In some embodiments, provider network 200 (or the services of provider network 200 individually) may implement various user management features. For example, provider network 200 may coordinate the metering and accounting of user usage of network-based services, including storage resources, such as by tracking the identities of requesting clients 250, the number and/or frequency of client requests, the size of data tables (or records thereof) stored or retrieved on behalf of user, overall storage bandwidth used by users or clients 250, class of storage requested by users or clients 250, or any other measurable user or client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other stream processing service 230, in one embodiment.

In various embodiments, stream processing service 230 may implement a stream processor for receiving, storing, processing, evaluating, and/or applying captured change data as a stream of changes (e.g., to a copy of portions or all of a database). For example, stream processing service 230 may implement a stream processor which may be one or multiple computing nodes, hosts, servers, or other resources that accept as input a stream of data objects, such as change records. In some embodiments, the stream processing service 230 may handle or process a data stream as a sequence of data records (e.g., change records) that may be generated by one or more data producers, such as a database engine head node as discussed below with regard to FIGS. 3-5) and accessed by one or more data consumers (e.g., an application that applies the changes to a copy of a portion or all of the database), where each data record may be assumed to be an immutable sequence of bytes. Stream processing service 230 may provide programmatic interfaces (e.g., application programming interfaces (APIs), web pages or web sites, graphical user interfaces, or command-line tools) to enable the creation, configuration and deletion of data streams, as well as the submission, storage and retrieval of stream data records in some embodiments. Some types of stream operations (such as stream creation or deletion) that involve interactions with stream processing service 230 control components may be referred to as "control-plane" operations herein, while operations such as data record submissions, storage and retrievals that typically (e.g., under normal operating conditions) do not require interactions with control components may be referred to herein as "data-plane" operations.

In at least some embodiments, stream processing service 230 may provide staged processing and delivery of data in a data stream. For instance, stream processing service 230 may maintain a workflow, graph, data structure or other representation of multiple stages of operations to be performed or delivered with respect to a data stream. For example, stream processing service 230 may implement different resources for performing one or more processing operations for data, sending the data to another service (e.g., a storage service), then send a request to another service. State information concerning the state of staged processing for a data stream may be maintained so that the next step or stage of processing data in the data stream may be identified. The workflow, graph, or data structure may indicate the various user identifiers, access keys, objects, configurations, or other information necessary to perform the desired stages.

Figure 3:
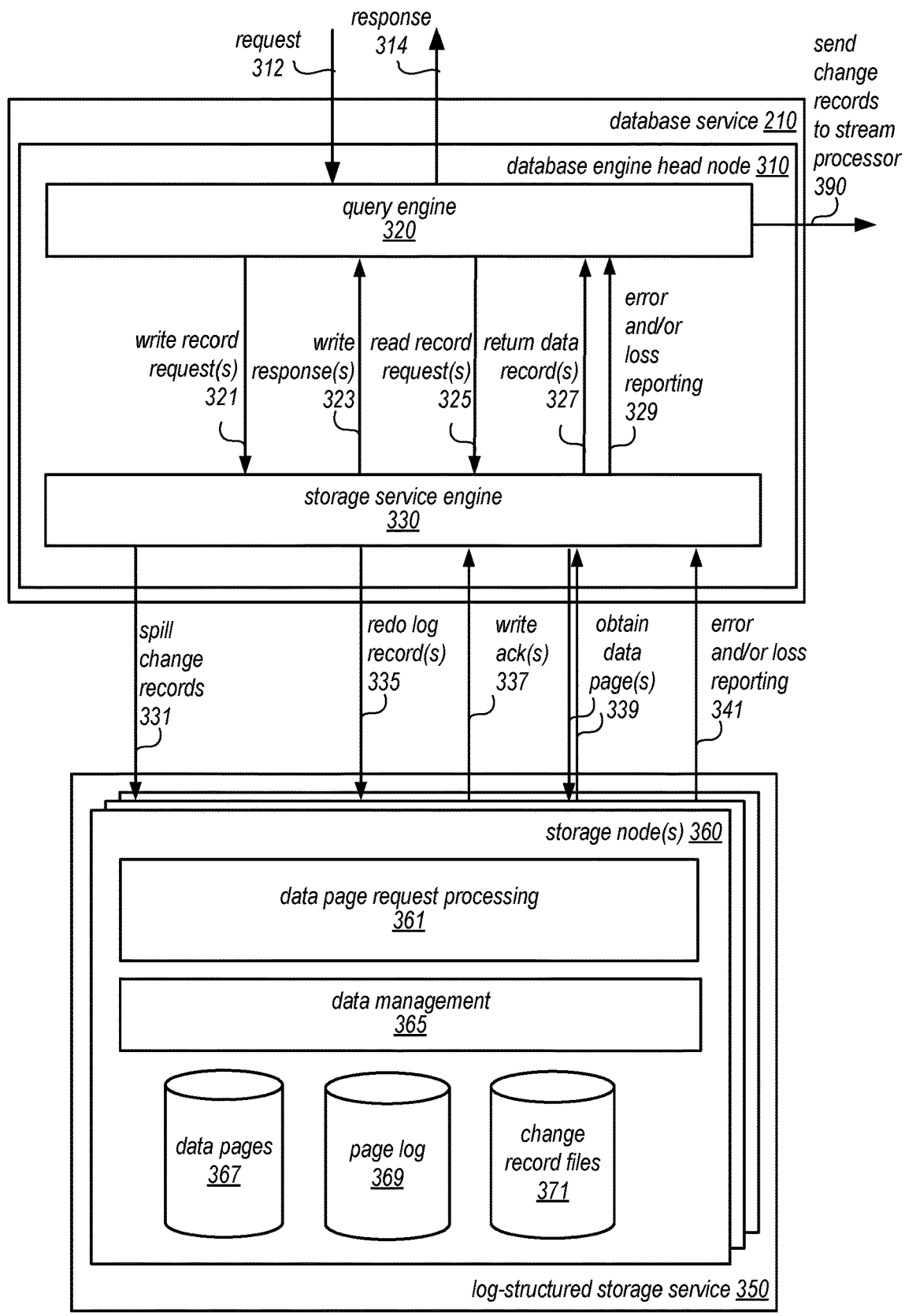
FIG. 3 is a logical block diagram illustrating various components of a database service and separate storage service, according to some embodiments.

FIG. 3 is a logical block diagram illustrating various components of a database service and separate storage service, according to some embodiments. Database service 210 may implement one or more different types of database systems with respective types of query engines for accessing database data as part of the database. In the example database system implemented as part of database service 210, a database engine head node 310 may be implemented for each of several databases and a log-structured storage service 350 (which may or may not be visible to the clients of the database system). Clients of a database may access a database head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

As previously noted, a database instance may include a single database engine head node 310 that implements a query engine 320 that receives requests, like request 312, which may include queries or other requests such as requests to perform transactions that include updates, deletions, reads, etc., from various client programs (e.g., applications) and/or subscribers (users), then parses them, optimizes them, and develops a plan to carry out the associated database operation(s). Query engine 320 may return a response 314 to the request (e.g., results to a query or acknowledgement of a transaction as committed or indication of a transaction as failed) to a database client, which may include acknowledgements, requested data, error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 (or another database system management component implemented at database engine head node 310 (not illustrated)) may manage a data page cache, in which data pages that were recently accessed may be temporarily held. Query engine 320 may be responsible for providing transactionality and consistency in the database instance of which database engine head node 310 is a component. For example, query engine 320 may be responsible for ensuring the Atomicity, Consistency, and Isolation properties of the database instance and the transactions that are directed that the database instance, such as determining a consistent view of the database applicable for a query, applying undo log records to generate prior versions of tuples of a database from dirty tuples received from storage nodes. Query engine 320 may manage an undo log to track the status of various transactions and roll back any locally cached results of transactions that do not commit.

FIG. 3 illustrates various interactions to perform various requests, like request 312. For example, a request 312 that includes a transaction to update the database (e.g., one or more requests to write to page(s)) may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to database tier components 560 (as write responses 323), which may then send corresponding responses (e.g., write acknowledgements) to one or more client clients as a response 314.

In another example, a request that is a query may cause data pages to be read and returned to query engine 320 for evaluation and processing may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or a generate a result of a query sent as a response 314.

Figure 4:
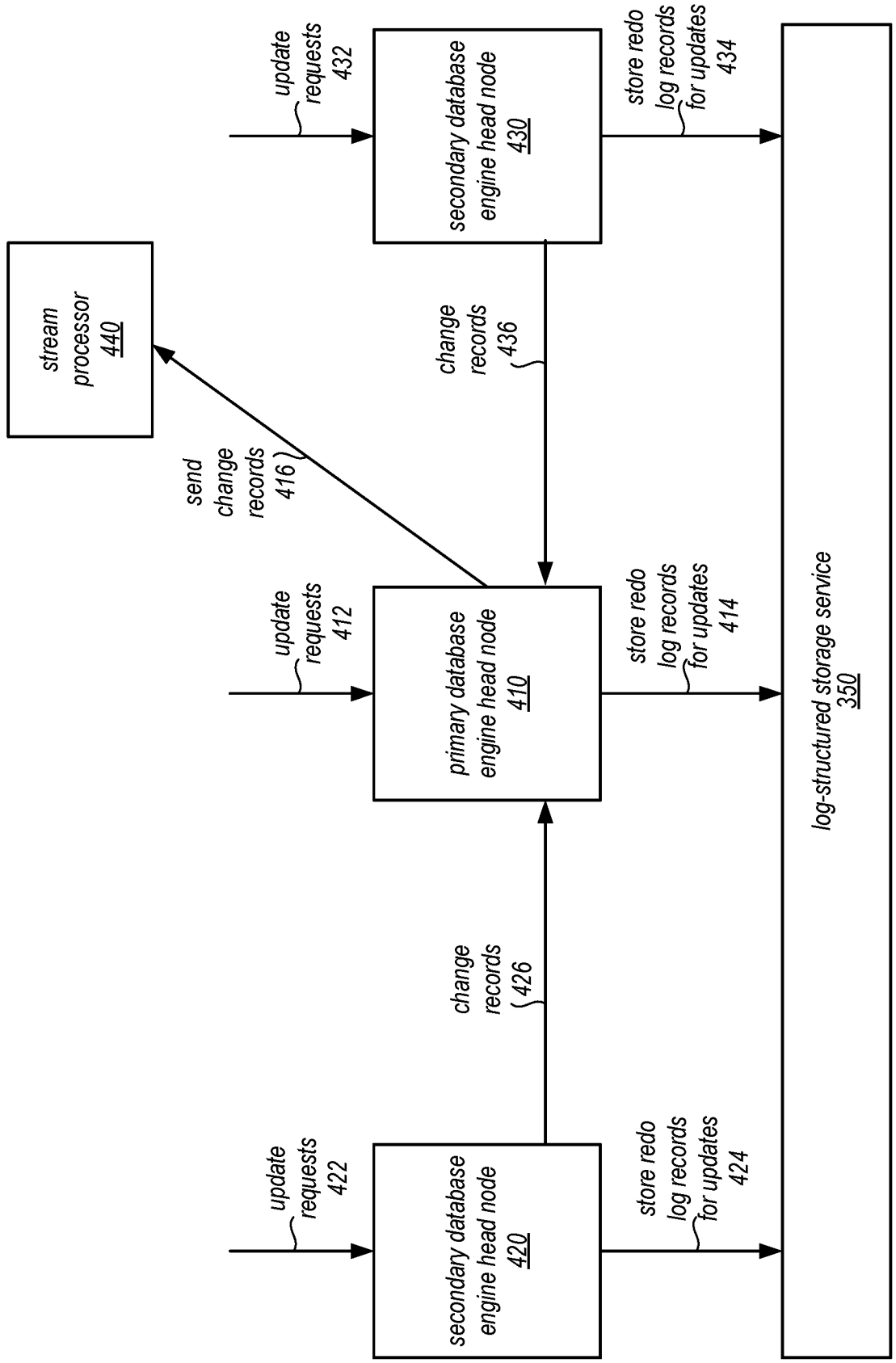
FIG. 4 is a logical block diagram illustrating performing asynchronous change data capture for direct external transmission across multiple database engine head nodes, according to some embodiments.

As discussed below with regard to FIGS. 4-6, query engine 320 (or another component of database engine head node 310 (not illustrated) may generate change indications as part of a change data capture feature enabled for a database, store the change indications in memory, and send 390 directly from memory the change data records to a stream processor. As discussed below with regard to FIGS. 5 and 6, some requests to store spilled change records 331 in change record files 371 may be performed as part of performing asynchronous change data capture (e.g., when a transaction exceeds a threshold size or time).

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of) various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, replication log processing 363, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages responsive to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Although FIG. 3 depicts a single database engine head node, in some embodiments, multiple writer database systems may implement asynchronous change data capture for direct external transmission (e.g., by implementing multiple database engine head nodes that can write to a database). FIG. 4 is a logical block diagram illustrating performing asynchronous change data capture for direct external transmission across multiple database engine head nodes, according to some embodiments. Primary database engine head node 410 may be similar to database engine head node 310 in FIG. 3 and may perform various requests (e.g., queries for data) as well as updates 412 to the database that may be included in a transaction by, for instance, storing redo log records for updates 414 to log-structured storage service. In addition to primary database engine head node 410, secondary database engine head nodes like secondary database engine head nodes 420 and 430 may also be implemented to perform requests like updates 422 and 432, which may result in requests 424 and 434 to store redo log records in log-structured storage service respectively.

Primary database engine head node 410 may coordinate the operations of secondary database engine head nodes 420 and 430, in some embodiments. For example, primary database engine head node 410 may implement change data capture for the database on behalf of all database engine head nodes. Change records for updates 422 and 432 may be generated by secondary database engine head nodes 420 and 430 (e.g., according to the techniques discussed below with regard to FIGS. 5 and 7) and be sent 426 and 436 to primary database engine head node 410, in some embodiments.

Primary database engine head node 410 may then order the transactions according to the commit order of the transactions, which, for example, may be determined according to LSN values assigned to the commitment of each transaction and may be able to order transactions performed across all database engine head nodes. Thus, primary database engine head node 410 may send change records 416 in the transaction order to stream processor 440, in some embodiments. However, in other embodiments a separate node (e.g., dedicated to change data processing) may receive change records from all database engine head nodes (e.g., both primary 410 and secondary 420 and 430), order and then send the transactions to stream processor. In another embodiment (not illustrated), each database engine head node may be responsible for a different portion of the database (e.g., a different "shard" of the database according to a user supplied sharding scheme) so that each database engine head node (whether secondary or primary) may send change records 416 for that shard directly to stream processor 440.

Figure 5:
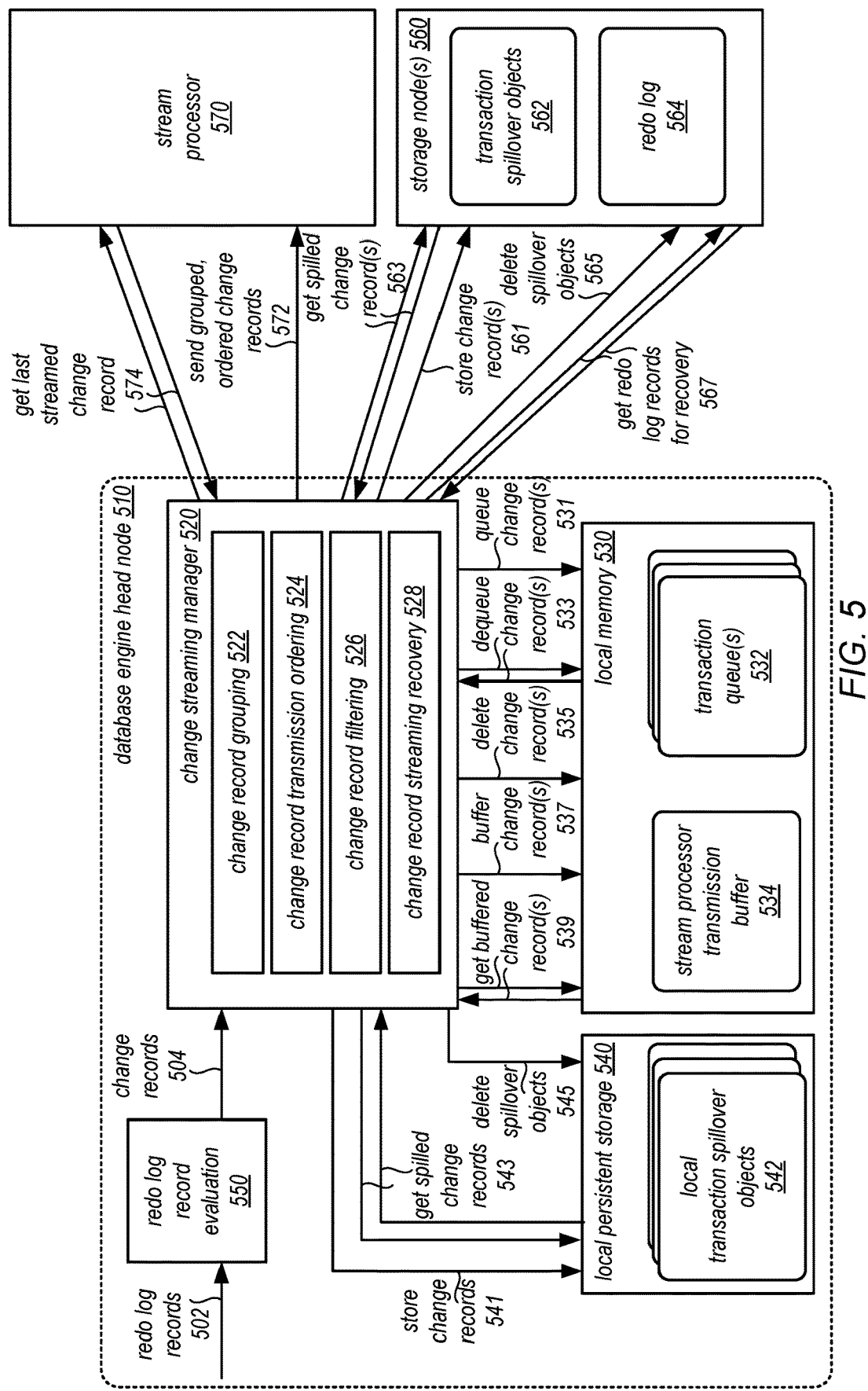
FIG. 5 is a logical block diagram illustrating a change streaming manager for a database engine head node, according to some embodiments.
Figure 6:
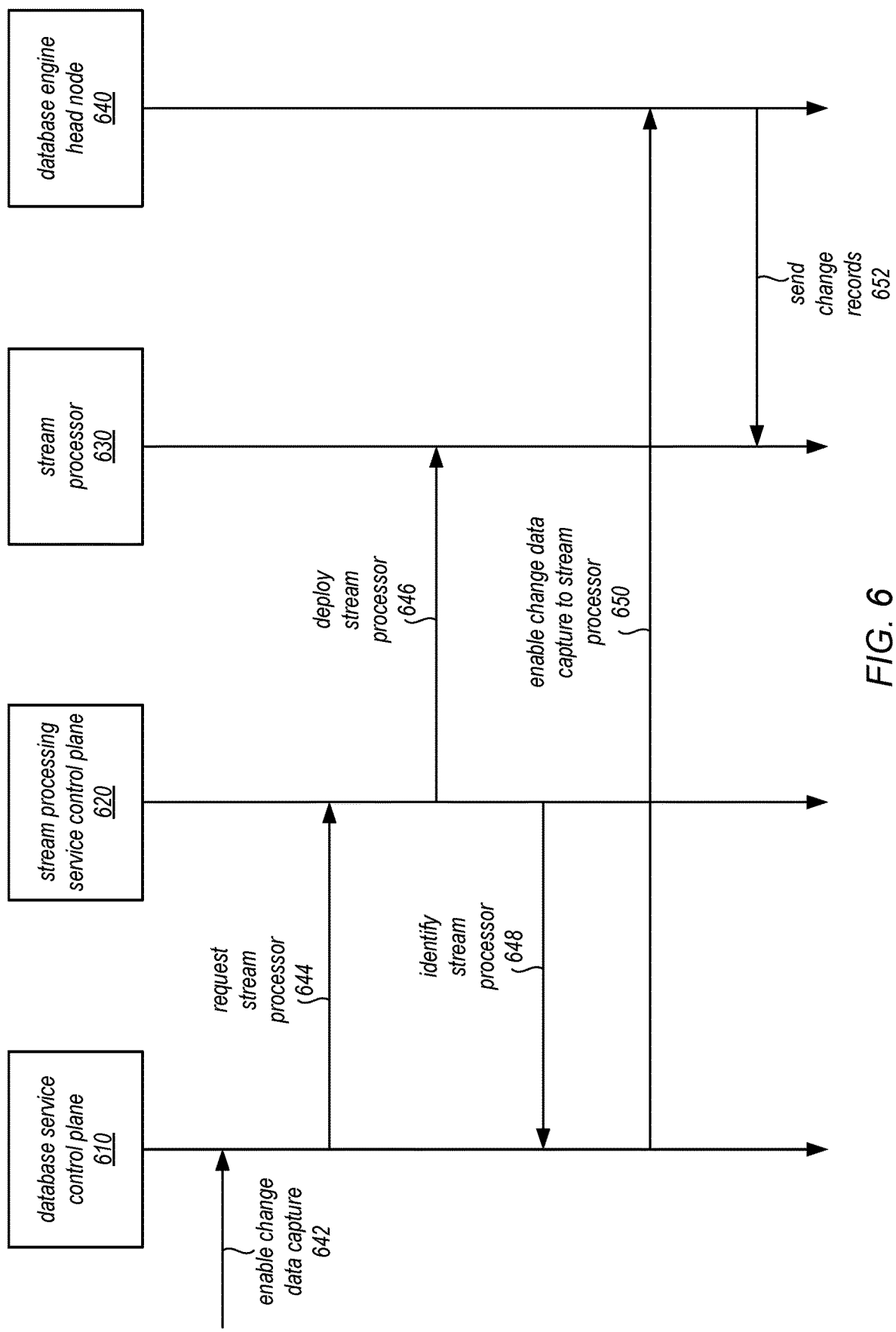
FIG. 6 is a logical sequence diagram illustrating a request to enable change data capture for a database, according to some embodiments.

FIG. 5 is a logical block diagram illustrating a change streaming manager for a database engine head node, according to some embodiments. A database engine head node 510 may implement the features of change streaming, in some embodiments. In other embodiments, not illustrated, a dedicated node, server, or subsystem within database service 210 may implement some or all of change streaming features illustrated in FIG. 5 before sending the change records to an external stream processor. Database engine head node 510 (which may be similar to database engine head nodes discussed above in FIGS. 3 and 4) may implement change streaming manager 520 to handle or otherwise process change records for a database where change data capture is enabled. As change streamlining manager 520 may be implemented as part of the query engine, database management system, or other portion of the database, in some embodiments, then change streaming manager 520 may quickly access the redo log as it is generated and sent according to the techniques discussed above with regard to FIG. 3.

Database engine head node 510 may implement redo log record evaluation 550, in various embodiments, to receive redo log records 502 to generate change records 504. In some embodiments, redo log record evaluation 550 may implement augmenting redo log records in order to extract change data capture information from the redo log records. Augmenting existing log records (e.g., generated for a transaction log, write ahead log, or other database logging feature/technique) may be an efficient way to capture and generate change data information as it may not involve the overhead of data page update or undo logging, when compared with writing to tables, the overhead of two-phase commit, when compared with writing to persistent storage, and without involving additional contention, when compared with writing to tables or to persistent storage. Recovery may also be less complicated because change records can then be committed or rolled back together with the update transaction being captured. Change data capture can be configured according to a user request received via an interface (e.g., by adjusting database parameters or a request like the request to enable change database capture 642 discussed below with regard to FIG. 6), which may determine how augmenting and other features of evaluating and generating change records 504 is performed, such as by enabling or disabling "before image propagation," "whole record image propagation," or "data definition language (DDL) propagation," among other features.

Change streaming manager 520 may handle the storage and transmission of change records, in various embodiments. For example, change streaming manager 520 may implement change record grouping 522. Change record grouping 522 may be enabled or disabled for change data capture, in some embodiments. Grouping 522 may store together those change records that are part of a single transaction, such as utilizing in-memory transaction queues 532. Change streaming manager 520 may implement change record filtering 526, in some embodiments. Change record filtering 526 may filter change records to remove those change records that are not to be included as part of the stream of changes (e.g., changes to unspecified tables or columns, or changes to table schema).

Figure 7:
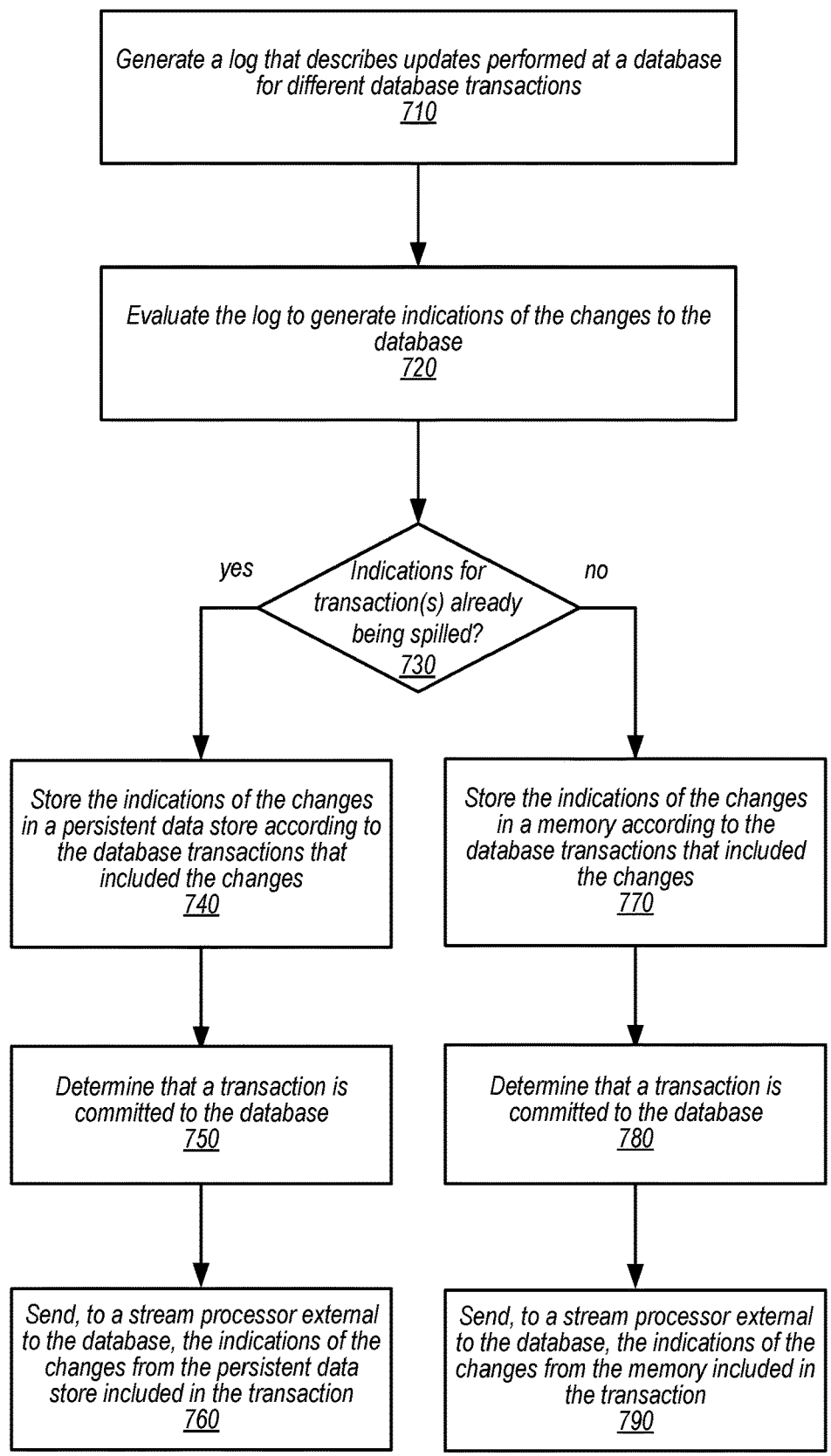
FIG. 7 is a high-level flow chart illustrating methods and techniques for asynchronous change data capture for direct external transmission, according to some embodiments.
Figure 8:
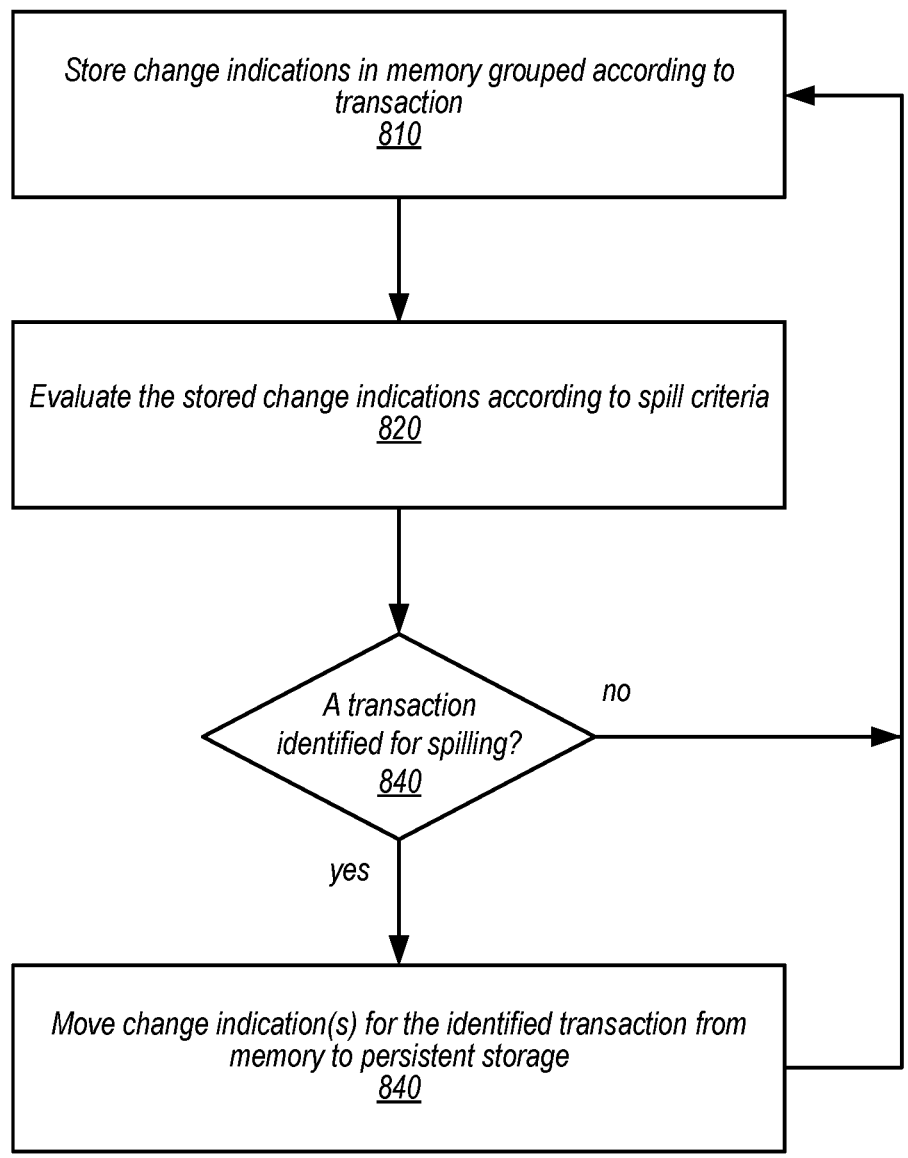
FIG. 8 is a high-level flow chart illustrating methods and techniques for spilling change indications to persistent storage before direct external transmission, according to some embodiments.

Change streaming manager 520 may implement techniques to store change records to local memory 530 (e.g., a portion of system memory 1020 in FIG. 10 that is allocated to change streamlining manger 520 or to database engine head node 510), local persistent storage 540, and/or at storage node(s) 560 (e.g., similar to storage nodes 360 of storage service 220) according to the various techniques discussed below with regard to FIGS. 7 and 8. For example, one or more transaction queue(s) 532 corresponding to individual transactions may be used to queue 531 change records. When a transaction is sent to stream processor 570 or spilled, change streaming manager 520 may dequeuer change records 533. When a transaction fails to commit, change streaming manager may delete 535 the corresponding change records of the transaction. For spilled transactions, change streaming manager may interact with local persistent storage 540, storing local transaction spillover objects 542, to store change records 541, get spilled change records 543, and delete 545 spillover objects 542 (e.g., when empty or failed to commit). Similarly, change streaming manager 520 may store 561 change records to transaction spillover objects 562 at storage nodes 560 (e.g., via a storage service driver in FIG. 3), get spilled change record(s) 563, and/or delete spillover objects 565.

When interacting with stream processor 570, change streaming manager 520 may support or utilize an interface for stream processor 570 to submit or send change records. In some embodiments, change records may be sent without grouping or ordering, grouped, ordered or as indicated at 572, grouped and ordered. Stream processor 570 may be implemented by one (or multiple) computing systems, like computing system 1000 in FIG. 10, and may implement as stream processing platform for receiving, storing, and processing the change records sent 572 as a stream. As discussed above with regard to FIG. 4, change record transmission ordering 524 may order transactions according to an order in which the transactions are committed, including transactions received as committed from other database engine head nodes. If stream processor 570 is unavailable (e.g., due to a network failure), or failed, change streamlining manager 520 may implement stream processor transmission buffer 534 to buffer 537 change records to be sent (e.g., according to the grouping and/or ordering of transactions) until the stream processor 570 is available or a new stream processor is available, when change streaming manager 520 may get 539 and send 572 the change records.

Figure 9:
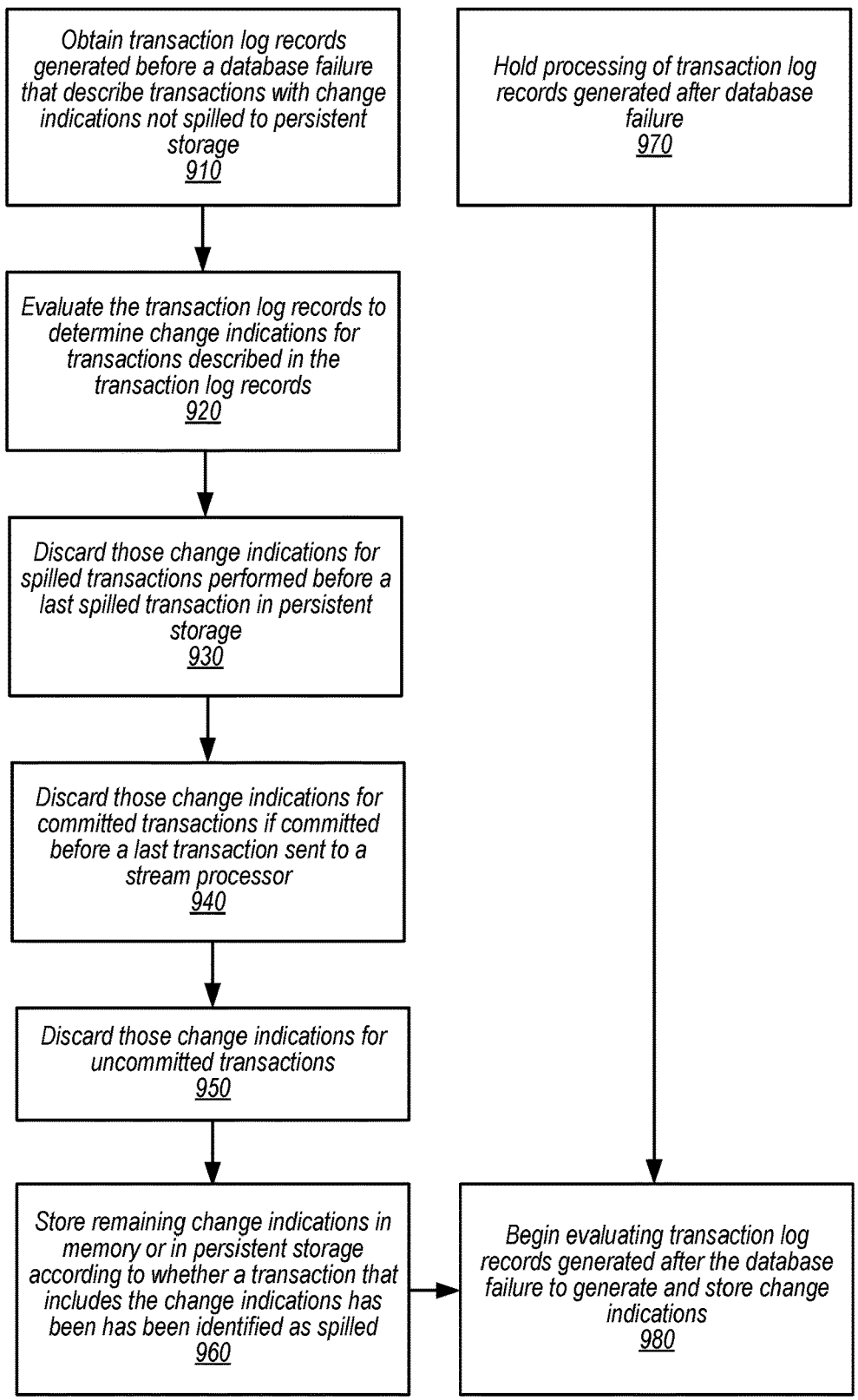
FIG. 9 is a high-level flow chart illustrating methods and techniques for recovering for asynchronous change data capture after database failure, according to some embodiments.

As discussed below with regard to FIG. 9, asynchronous change data capture may optimize performance of recovery. Change streamlining manager 520 may implement change record streaming recovery 528 which may perform the techniques to recover change data capture for a database. For instance, change record streaming recovery 528 may get redo log records for recovery 567 (e.g., according to the techniques discussed below in FIG. 9), from redo log 564 in storage node(s) 560, to generate change records for those updates that occurred before the failure but were not stored and/or transmitted. Change record streaming recovery 528 may send a request 574 to stream processor 570 to ask for an identifier (e.g., LSN) of the last transaction sent to stream processor 570, which may be used to discard change records that have already been sent, in some embodiments.

In some scenarios, change data capture can be integrated within the same provider network to take advantage of other different services in the provider network, such as stream processing service as well as other data storage services that may use the stream processing service to update a copy of the data in the database (e.g., updating a data warehouse copy of the database). For example, a database service can automatically provision and start a stream processor to handle change capture data for a database using provider network resources. FIG. 6 is a logical sequence diagram illustrating a request to enable change data capture for a database, according to some embodiments.

As indicated at 610, a request to enable change data capture 642 may be received at a control plane 610 for the database service. The request 642 may specify the type of stream processor 630 (e.g., a stream processing platform for implementing the handling of change records, such as Apache's Kafka stream processing platform or other stream processing platforms, such as a platform implemented as part of stream processing service 230 in FIG. 2). The request may specify various features of change data capture processing, such as features that control how/when change records are spilled from memory to persistent storage (e.g., various threshold values). In some embodiments, the request may identify change data capture for particular items/features of a database (e.g., such as enabling change data capture for specific tables (and/or columns of the tables)).

As indicated at 644, database service control plane 610 may send a request to stream processing service control plane 620 to request a stream processor for implementing change data capture for the database. The request 644 may include various features to provision a stream processor 630 according to the configuration or other feature specified in the request 642 (e.g., as indicated by a user via the request 642). Stream processing service control plane 620 may perform various operations or workflows to deploy 646 stream processor 630 according to the specified configuration (e.g., including upload of applications, operations, or other instructions for handling change records, including where to send or how to apply the changes to the a copy of some (or all) of the data of the database, in some embodiments. Note that stream processor 630 may, in various embodiments, be one or multiple different nodes, servers, or systems that handle a stream of records, such as change records for processing.

When stream processor 630 is ready, stream processing service control plane 620 may identify 648 the stream processor to database service control plane 610, in various embodiments. For example, stream processing service control plane 620 may provide a network address, identifier, access credentials and/or other information to send change records to stream processor 630. Database service control plane 610 may then enable 650 change data capture to the stream processor at database engine head node 640, in some embodiments. For example, the request 650 may be an instruction to change a parameter or configuration of database engine head node 640 to send change records 652 to stream processor 630, according to the various techniques discussed above with regard to FIGS. 4 and 5 and below with regard to FIGS. 7-9.

The database service, storage service, and stream processing service discussed in FIGS. 2 through 6 provide examples of a system that may perform asynchronous change data capture for direct external transmission. However, various other types of data stores (e.g., non-log structured) or other database systems may implement asynchronous change data capture for direct external transmission. FIG. 7 is a high-level flow chart illustrating methods and techniques for asynchronous change data capture for direct external transmission, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

Updates to a database may be received through various interfaces, query languages, protocols, or other database features to support the receipt and performance of requests to change or otherwise modify the database contents (e.g., table values) or structure (e.g., table schema, such as adding, removing or modifying a column of a table). A database may treat these updates as performed as part of respective transaction. For instance, a database transaction may include a single update, or a transaction may include multiple updates. Transactions may include other operations, such as operations to read data from the database (which may determine whether other updates are performed or what the values of those updates may be) or may only include updates. A transaction may commit to a database, in various embodiments, according to a determination made by the database that performance of the transaction does not result in any errors that violate a supported feature of the database (e.g., such as compliance with Atomicity Consistency Isolation and Durability (ACID) with respect to the transaction and other received transactions). A commitment of a transaction may indicate that the transaction is considered to be applied to the database (e.g., and is recorded either in the database directly or in a persistent location from which the transaction may be eventually applied to the database). A transaction (and the one or more updates included in the transaction) may be treated as a single unit of work by the database so that either all of the transaction commits (e.g., all update(s) are performed) or no updates are performed.

As indicated at 710, a log may be generated that describes update performed at a database for different database transactions, in various embodiments. For example, a redo log (as discussed above) may record the operations or changes made to data within the database (e.g., contents or metadata, such as database schema, system data, etc.). These redo log records may include information to "redo" or otherwise recreate a change to the database described in an update and may be applied in an order (e.g., a logical sequence number (LSN) order) to generate the state of the database inclusive of the changes described by the redo log. In other embodiments, other transaction logging techniques may be implemented (e.g., by generating "transaction log" records which may be similar to redo log records or other records that describe performed transactions).

As indicated at 720, the log may be evaluated to generate indications of the changes to the database, in some embodiments. For example, the redo log may contain updated values (e.g., as opposed to the operation that created the updated values, such as an addition or subtraction operation). The evaluation of the log may determine what change(s) were made, how the changes were made, and/or other information that can be used to capture and perform the changes again at, for instance, another copy of the database (which may be implemented in a different data store or format, like a data warehouse that supports Online Analytic Processing (OLAP) queries instead of a relational database which implements Online Transaction Processing (OLTP) queries). Various different log evaluation techniques may be implemented as well as different forms of representing the changes (e.g., logical representation that describes the operation in order to recreate (or perform a corresponding) operation at a different location, or a difference value which can be used to perform a different operation that results in the same change being made to the copy of the database.

As indicated at 730, a determination may be made when processing the generated indications of the changes to determine where to store the indications of the changes. For example, a transaction map (e.g., associating transaction identifiers with storage locations (e.g., addresses, pointers, filenames, data structures, etc.) may be implemented and compared with a transaction identifier for change indication (which may be determined as part of the evaluation discussed above at 720) to determine whether to store the change indication in a memory or in persistent storage. As discussed below with regard to FIG. 8, different criteria or scenarios may cause a transaction to be identified as spilled to persistent storage instead of the change indications being stored only in memory.

For those transactions that are not spilled, the corresponding indications of the changes may be stored in a memory according to the database transactions that included the changes, as indicated at 770, in various embodiments. For example, as discussed above with regard to FIG. 5, change indications may be grouped according to transaction, using, for instance, in-memory queues, where each queue stores the changes for one transaction. Change indications may remain in memory (e.g., unless spilled to persistent storage as discussed below with regard to FIG. 8) until the transaction that includes the change(s) is committed. As indicated at 780, a determination that the transaction is committed to the database may be made (e.g., identifying a commit record in the transaction log that identifies the transaction that has been committed along with an LSN that corresponds to the point in time at which the transaction is visible in the database).

As indicated at 780, the change indications of the changes included in the transaction may be sent from the memory to the stream processor that is external to the database, in various embodiments. For example, the change indications in the in-memory queue may be de-queued and sent (as one or more batches or individually) to a stream processor via an interface for the stream processor that the database has established a network connection with in order to submit the change indications to the stream processor via an interface supported by the stream processor. As discussed above with regard to FIGS. 4 and 5, the transactions may be sent according to an order in which the transactions are committed (e.g., so that transaction B may be sent after transaction A if transaction A is committed earlier), in some embodiments. In some embodiments, the change indications for committed transactions from multiple different database engines (e.g., in a multi-writer database) may be combined in a single location and ordered before being sent).

The transactions may be sent directly to the stream processor from the database without an intermediate system performing other transformations or manipulations to the change records, in some embodiments. In this way, extraction tools or other change data capture tools do not have to be employed to obtain the transaction log for the database, generate change indications, and propagate those change indications to a stream processor for application to another copy of the database, for example. The performance costs of obtaining the change indications from memory and sending them directly to the stream processor (e.g., via a network connection) may significantly reduce the cost of implementing change data capture, as costly persistent storage read and write operations may be avoided, as well as the transmitting, reading, writing, and other processing costs of employing an intermediate change data capture system external to the database in order to send change indications to the stream processor.

For those transactions that are spilled, the indications of the changes may be stored in a persistent data store according to the database transactions that included the changes, as indicated at 740, in some embodiments. For example, an append only file or data structure (e.g., corresponding to a transaction or group of transactions) may be used to quickly write change indications to persistent storage (e.g., by avoiding seek costs to locate a storage location particular to a change indication in the file or data structure). As indicated at 750, a determination that the transaction is committed to the database may be made (e.g., identifying a commit record in the transaction log that identifies the transaction that has been committed along with an LSN that corresponds to the point in time at which the transaction is visible in the database).

As indicated at 760, the change indications of the changes included in the transaction may be sent from the persistent data store to the stream processor that is external to the database, in various embodiments. For example, the change indications in append-only file may be extracted and sent (as one or more batches or individually) to a stream processor via an interface for the stream processor that the database has established a network connection with in order to submit the change indications to the stream processor via an interface supported by the stream processor. The transactions may be sent directly to the stream processor from the database without an intermediate system performing other transformations or manipulations to the change records, in some embodiments. As noted earlier, in this way, extraction tools or other change data capture tools do not have to be employed to obtain the transaction log for the database, generate change indications, and propagate those change indications to a stream processor for application to another copy of the database, for example. The performance costs of obtaining the change indications from within the database and sending them directly to the stream processor (e.g., via a network connection) may significantly reduce the cost of implementing change data capture, as the transmitting, reading, writing, and other processing costs of employing an intermediate change data capture system external to the database in order to send change indications to the stream processor may be avoided.

Storing the change indications may be performed asynchronous to the processing of the updates and transactions at the database (e.g., whether stored in memory or in persistent storage). For example, an update may be performed at the database (e.g., the values may be changed or recorded in the transaction log), or transaction committed, without waiting to generate corresponding change(s) for the update/transaction. In this way, client applications of the database do not have additional time added when performing updates that would have to otherwise wait on the change indications to be generated (and in some circumstances sent to a stream processor) in order to receive a response (e.g., performing change data capture by generating the change indications synchronously with the performance of updates).

As noted above, change indications may be stored in memory in order to avoid the costs of writing data to persistent storage. Such techniques may provide optimal performance for those workloads that utilize a high frequency of short (e.g., in terms of length of time or amount of change) transactions, as the transactions may be quickly sent out to a stream processor without waiting long to be committed. However, in other scenarios, longer transactions may still rely upon persistent storage to avoid overrunning the space constraints of memory for storing change indications (e.g., as memory may be limited in order to save memory for other processes or operations) and/or failure scenarios where volatile memory that would lose stored change indications upon failure could result in longer recovery times to begin change data capture again. FIG. 8 is a high-level flow chart illustrating methods and techniques for spilling change indications to persistent storage before direct external transmission, according to some embodiments.

As indicated at 810, change indications may be stored in memory, grouped according to transaction, in various embodiments. For example, in-memory queues, hash tables, and/or other data structures may be used to insert additional change indications for a transaction (or start storing change indications for a new transaction). As indicated at 820, the stored change indications may be evaluated according to spill criteria, in some embodiments. For example, an overall size of the stored change indications (e.g., the total size of all in-memory queues) may be compared with a size limitation or threshold for storing change indications in memory. If the size exceeds the size limitation or threshold, then one or more transactions may be identified for spilling in order to reduce the size of the stored change indications. Other spill criteria may be evaluated, in some embodiments. For example, length of time since a transaction was added to memory may be tracked (e.g., via timers or by comparing an LSN value with a current database LSN value used for a most recent transaction). If the length of time for the oldest transaction exceeds a threshold value (e.g., greater than a threshold amount of time or greater than an LSN value difference), then a transaction may be identified for spilling.

In some embodiments, combinations of spilling criteria may be evaluated. For example, both a size threshold and length of time evaluated. Satisfying either criteria for size or length of time may cause the identification of a transaction for spilling. In this way different risks of retaining change indications in memory may be mitigated. For example, the application of a size threshold may prevent large transactions with many updates from overutilizing the memory allocated to storing change indications, while the application of the time threshold can be used to allow for long running transactions to be stored in persistent storage so that the transaction log can be trimmed, reducing the amount of time that for recovery by reducing the amount of transaction log records that may have to be evaluated. Although time and size are given as some examples, other criteria may be utilized. For instance, different criteria for different transactions could be applied (e.g., high-priority vs low priority transactions) that consider the source of the transaction (e.g., a user/client application) so that the source of a transaction may dictate whether the transaction is spilled (or not).

As indicated at 840, a transaction may (or may not) be identified for spilling. In some embodiments, the transaction identified for spilling may correspond to the transaction that satisfied the spill criteria (e.g., a large transaction with a number of updates that exceeds a threshold). Alternatively, in some embodiments, a selection scheme may be applied. For instance, in some embodiments, the oldest transactions (e.g., according to an LSN identifier for the transaction) may be identified. In some embodiments, multiple transactions may be identified until the criteria for spilling is no longer met (e.g., total size of stored transactions below the threshold size or no transaction is stored longer than the time threshold).

As indicated at 840, change indication(s) for the identified transaction may be moved from memory to persistent storage, in some embodiments. For example, a new transaction file or object may be created and the existing change indications in memory copied to the new file or object. In some embodiments, a single file for transactions (e.g., an append only file) may be implemented and the change indications may written to the file according to their respective order within the transaction.

Database failure (e.g., as a result of software, hardware, power, network, or other factors), can disrupt the performance of a database. When change data capture is enabled, the impact of database failure could cause additional considerations for recovery from the failure in order to return to regular operation of the database. As discussed above with regard to FIG. 5, asynchronous change data capture for direct transmission can improve the performance of recovery from database failure in order to continue change data capture. FIG. 9 is a high-level flow chart illustrating methods and techniques for recovering for asynchronous change data capture after database failure, according to some embodiments.

As indicated at 910, transaction log records generated before a database failure that describe transactions with change indications not spilled to persistent storage may be obtained, in some embodiments. For example, an LSN associated with an oldest transaction maintained in persistent storage may be maintained and compared with the LSN of transaction log records. Those transaction log records less than the LSN of the oldest transaction may not need to be obtained (as their change indications if not already sent to the stream processor may already be in the persistent data store if a technique that removes the oldest transaction from memory is performed when spilling a transaction as discussed above), in some embodiments.

As indicated at 920, the transaction log records may be evaluated to determine change indications for transactions described in the transaction log records. Similar to the techniques discussed above with regard to FIG. 7, description of the changes may be determined in order to make the change indications capable of describing how to reapply the changes to a new copy of the database data (which may be stored in a different type of database or data store). As indicated at 930, those change indications for spilled transactions performed before a last spilled transaction in persistent storage may be discarded. For example, those change indications with an LSN less than the LSN of the last spilled transaction (e.g., the most recently stored transaction in persistent storage) may be discarded (e.g., as these change indications may be for transactions that did not complete before the database failure). As indicated at 940, those change indications for committed transactions if committed before a last transaction sent to a stream processor may be discarded (e.g., as those changes may already have been committed to the persistent store or already sent to the stream processor), in some embodiments. As indicated at 950, discard those change indications for uncommitted transactions may be discarded, in some embodiments. The remaining change indications may be stored in memory or in persistent storage according to whether a transaction that includes the change identification was identified for spilling, as indicated at 960, in some embodiments.

In various embodiments, recovery of the database may be complete before and without waiting on completing recovery of change data capture for the database. Thus, while recovery of change data capture is performed, new transaction log records for new database transactions may be created. In some embodiments, processing of transaction log records generated after the database failure may be held, as indicated at 970, in some embodiments. Once recovery of change data capture is complete by storing the remaining change indications, as indicated at 960, then evaluation of the new transaction log records generated after the database failure may begin to generate and store change indications, as indicated at 980.

The methods described herein may in various embodiments be implemented by any combination of hardware and software. For example, in one embodiment, the methods may be implemented by a computer system (e.g., a computer system as in FIG. that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

FIG. 10 is a block diagram illustrating a computer system that may implement at least a portion of the systems and techniques for asynchronous change data capture for direct external transmission described herein, according to various embodiments. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be implemented as described herein. For example, the information described herein as being stored by the database tier (e.g., on a database engine head node), such as a change indication, transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., spilled change indications, redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of head nodes collectively implementing a database system, wherein individual ones of the plurality of head nodes respectively comprise:
at least one processor; and
a memory; and
wherein the database system is configured to:
perform, by the plurality of head nodes, a plurality of different database transactions that update a single database, wherein to perform the plurality of different database transactions, individual ones of the plurality of head nodes of the database system are configured to generate respective transaction logs that describes changes to the single database caused by the performing of the plurality of different database transactions by the plurality of head nodes; and
generate, based at least in part on the generated transaction logs and asynchronous to the performance of the database transactions, a data stream of change indications, wherein to generate the data stream of change indications the database system is configured to:
evaluate, by respective ones of the plurality of head nodes, the respective transaction logs to generate indications of the changes to the single database;
group, in the memory of a primary head node of the plurality of head nodes according to the different database transactions, respective ones of the indications of the changes generated by the plurality of head nodes to generate a plurality of grouped indications of the changes to the single database, wherein individual ones of the plurality of grouped indications of the changes correspond to respective ones of the different database transactions performed by respective head nodes of the plurality of head nodes; and
after a determination that one or more of the different database transactions are committed to the single database, send, from the memory of the primary head node directly to a stream processor external to the single database, the respective grouped indications of the changes of the committed one or more of the different database transactions performed by the plurality of head nodes.

2. The system of claim 1 wherein the database system is further configured to:
evaluate the stored change indications in the memory according to spill criteria;
identifying another one of the database transactions for spilling to persistent storage;
moving those change indications for the identified database transaction from the memory to persistent storage; and
after determining that the other database transaction is committed to the database, sending the change indications for the other database transaction stored in the persistent storage to the stream processor.

3. The system of claim 1, wherein to send the grouped indications of the changes from the memory included in the one or more database transactions the database system is configured to send the one or more database transactions according to an order in which the one or more database transactions committed to the database.

4. The system of claim 1, wherein the database system is implemented as part of a database service offered as part of a provider network, wherein the stream processor is implemented as part of a provider network and wherein the database system is further configured to:
receive, via an interface for a control plane for the database service, a request to enable change data capture for the database, wherein a control plane for the database service causes the stream processor to be deployed;
responsive to the request, perform the evaluation and the grouping of the indications of the changes in the memory.

5. A method, comprising:
asynchronous to a plurality of updates performed at a single database by two or more head nodes of the database:
evaluating respective logs of the two or more head nodes that describe the plurality of updates performed at the database for different database transactions to generate indications of changes to the single database performed by respective head nodes of the two or more head nodes;
storing the indications of the changes generated from the respective logs of the two or more head nodes in a memory of a change streaming manager, grouped according to the different database transactions; and
after determining that one or more of the different database transactions are committed to the database, sending, from the memory of the change streaming manager to a stream processor external to the single database, the respective grouped indications of the changes of the committed one or more database transactions performed by the two or more head nodes.

6. The method of claim 5, further comprising:
evaluating the stored change indications in the memory according to spill criteria;
identifying another one of the database transactions for spilling to persistent storage;
moving those change indications for the identified database transaction from the memory to persistent storage; and
after determining that the other database transaction is committed to the database, sending the change indications for the other database transaction stored in the persistent storage to the stream processor.

7. The method of claim 5, further comprising:
determining that another one of the database transactions did not commit to the database; and
removing those change indications included in the other database transaction from the memory.

8. The method of claim 5, further comprising:
responsive to determining that the stream processor is unavailable, buffering the indications of the changes from the memory included in the one or more database transactions determined to be committed to the database; and
responsive to determining that the stream processor is available, performing the sending of the indications of the changes to the stream processor.

9. The method of claim 5, further comprising:
receiving, via an interface for a control plane for the database, a request to enable change data capture for the database;
responsive to the request:
causing the stream processor to be deployed; and
performing the evaluating and the storing.

10. The method of claim 5,
wherein the evaluating, the storing, and the sending are performed by a first database engine head node;
wherein the method further comprises receiving one or more indications of changes for another database transaction to the database performed by a second database engine head node; and
wherein sending the indications of the changes from the memory included in the one or more database transactions comprises including the one or more indications of changes for the other database transaction ordered with respect to the one or more database transactions according to an order in which database transactions committed to the database.

11. The method of claim 5, wherein storing the indications of the changes in a memory according to the different database transactions that included the changes comprises grouping the indications of the changes in the memory.

12. The method of claim 5, wherein sending the change indications for the one or more database transactions from the memory to the stream processor comprises sending the one or more database transactions according to an order in which the one or more database transactions committed to the database.

13. The method of claim 5, further comprising:
after a failure of the database:
obtaining a plurality of transaction log records generated before the database failure that describe additional database transactions with change indications not spilled to persistent storage;
evaluating the plurality of transaction log records to determine change indications for the additional database transactions;
discarding those change indications for spilled transactions performed before a last spilled database transaction in persistent storage;
discarding those change indications for committed ones of the additional database transactions that are committed before a last transaction sent to the stream processor;
discarding those change indications for uncommitted ones of the additional database transactions; and
storing remaining ones of the change indications for the additional database transactions.

14. One or more non-transitory, computer-readable storage media, storing program instructions that when executed on or across one or more computing devices cause the one or more computing devices to implement a single database that implements:
asynchronous to a plurality of updates performed at the single database by two or more head nodes of the single database:
evaluating respective logs of the two or more head nodes that describe the plurality of updates performed at the single database for different database transactions to generate indications of changes to the database performed by the two or more head nodes;
grouping, in a memory of a primary head node of the two or more head nodes according to the different database transactions, respective ones of the indications of the changes generated from the respective logs of the two or more head nodes to generate a plurality of grouped indications of the changes to the single database, wherein individual ones of the plurality of grouped indications of the changes correspond to respective ones of the different database transactions performed by respective head nodes of the two or more head nodes; and
after determining that one or more of the different database transactions are committed to the single database, sending, from the memory of the primary head node directly to a stream processor external to the single database, the respective grouped indications of the changes of the committed one or more database transactions performed by the two or more head nodes.

15. The one or more non-transitory, computer-readable storage media of claim 14, wherein, in sending, directly to a stream processor external to the database, the grouped indications of the changes from the memory included in the one or more database transactions, the program instructions cause the one or more computing devices to implement sending the one or more database transactions according to an order in which the one or more database transactions committed to the database.

16. The one or more non-transitory, computer-readable storage media of claim 14, wherein the one or more non-transitory, computer-readable storage media further comprise additional program instructions that when executed on or across the one or more computing devices cause the one or more computing devices to implement:
evaluating the stored change indications in the memory according to spill criteria;
identifying another one of the database transactions for spilling to persistent storage;
moving those change indications for the identified database transaction from the memory to persistent storage; and
after determining that the other database transaction is committed to the database, sending the change indications for the other database transaction stored in the persistent storage to the stream processor.

17. The one or more non-transitory, computer-readable storage media of claim 16, wherein the one or more non-transitory, computer-readable storage media further comprise further program instructions that when executed on or across the one or more computing devices cause the one or more computing devices to implement:
generating one or more additional indications of changes according to one or more additional updates to the database that are included in the other database transaction; and responsive to determining that the other database transaction is spilled to the persistent storage, storing the one or more additional indications of changes to the persistent storage.

18. The one or more non-transitory, computer-readable storage media of claim 14, wherein the one or more non-transitory, computer-readable storage media further comprise additional program instructions that when executed on or across the one or more computing devices cause the one or more computing devices to implement:
after a failure of the database:
obtaining a plurality of transaction log records generated before the database failure that describe additional database transactions with change indications not spilled to persistent storage;
evaluating the plurality of transaction log records to determine change indications for the additional database transactions;
discarding those change indications for spilled transactions performed before a last spilled database transaction in persistent storage;
discarding those change indications for committed ones of the additional database transactions that are committed before a last transaction sent to the stream processor;
discarding those change indications for uncommitted ones of the additional database transactions; and
storing remaining ones of the change indications for the additional database transactions.

19. The one or more non-transitory, computer-readable storage media of claim 14,
wherein, in grouping the indications of the changes in a memory according to the different database transactions that included the changes, the program instructions cause the one or more computing devices to implement storing individual ones of the indications of the change in a queue in the memory that corresponds to the transaction that includes the change; and
wherein, in sending, directly to a stream processor external to the database, the grouped indications of the changes from the memory included in the one or more database transactions, the program instructions cause the one or more computing devices to implement removing from the one or more queues in the memory the indications of the changes.

20. The one or more non-transitory, computer-readable storage media of claim 14, wherein, in sending, directly to a stream processor external to the database, the grouped indications of the changes from the memory included in the one or more database transactions, the program instructions cause the one or more computing devices to implement filtering out the indications of changes to send only those changes to a specified table or a specified column in the database.

* * * * *